US009280268B2

(12) United States Patent  
von Bochmann et al.

(10) Patent No.: US 9,280,268 B2  
(45) Date of Patent: Mar. 8, 2016

(54) IDENTIFYING EQUIVALENT JAVASCRIPT EVENTS

(71) Applicant: International Business Machines Corporation, Armonk, NY (US)

(72) Inventors: Gregor von Bochmann, Ottawa (CA); Nevon C. Brake, Kanata (CA); Mustafa Emre Dincturk, Ottawa (CA); Paul Ionescu, Kanata (CA); Guy-Vincent Jourdan, Ottawa (CA); Iosif Viorel Onut, Kanata (CA); Wayne Duncan Smith, Kanata (CA); Seyed M. Mir Taheri, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 242 days.

(21) Appl. No.: 13/947,705

(22) Filed: Jul. 22, 2013

(65) Prior Publication Data

US 2014/0053089 A1 Feb. 20, 2014

(30) Foreign Application Priority Data

Aug. 16, 2012 (CA) ..................................... 2786418

(51) Int. Cl.
*G06F 3/048* (2013.01)
*G06F 3/0484* (2013.01)
*G06F 9/44* (2006.01)

(52) U.S. Cl.
CPC .............. *G06F 3/0484* (2013.01); *G06F 8/751* (2013.01)

(58) Field of Classification Search
CPC ............ G06F 3/0484; G06F 17/30864; G06F 17/30861; G06F 9/44521; G06F 17/2247; G06F 17/3089
See application file for complete search history.

(56) References Cited

U.S. PATENT DOCUMENTS

| 7,536,389 B1* | 5/2009 | Prabhakar ......... G06F 17/30864 |
| 7,584,194 B2 | 9/2009 | Tuttle et al. |
| 7,716,322 B2 | 5/2010 | Benedikt et al. |
| 8,024,384 B2 | 9/2011 | Prabhakar et al. |
| 8,381,094 B1* | 2/2013 | Prasad ................ G06F 17/2211 709/203 |
| 2007/0150342 A1* | 6/2007 | Law et al. ........................ 705/14 |
| 2007/0208828 A1* | 9/2007 | Brier et al. .................... 709/219 |

(Continued)

OTHER PUBLICATIONS

Ajax Crawler, Mar. 15, 2012.*

(Continued)

*Primary Examiner* — Tadeese Hailu  
(74) *Attorney, Agent, or Firm* — Cuenot, Forsythe & Kim, LLC (57) ABSTRACT

Identifying equivalent JavaScript events includes receiving source code containing two JavaScript events for equivalency analysis, extracting an HTML element containing an event from each JavaScript event and analyzing the extracted HTML elements. Responsive to a determination that the HTML elements are of a same type according to equivalency criteria B, and responsive to a determination that the HTML elements have a same number of attributes according to equivalency criteria C, a determination is made whether JavaScript function calls of each JavaScript event are similar according to equivalency criteria A. Responsive to a determination that the JavaScript function calls are similar according to equivalency criteria A, and responsive to a determination that the other attributes of the HTML elements satisfy equivalency criteria D, the JavaScript events are identified as equivalent.

20 Claims, 8 Drawing Sheets

(56) References Cited

U.S. PATENT DOCUMENTS

| | | | |
|---|---|---|---|
| 2009/0288099 A1 | 11/2009 | Rybak et al. | |
| 2010/0287152 A1 | 11/2010 | Hauser | |
| 2012/0117569 A1* | 5/2012 | Fogel et al. | 718/102 |
| 2012/0177297 A1* | 7/2012 | Everingham | 382/229 |
| 2013/0073536 A1* | 3/2013 | Fedorynski | G06F 17/30887 707/709 |

OTHER PUBLICATIONS

Shi, L. et al., "A DOM tree alignment model for mining parallel data from the web," In Proc. of the 21st Int'l. Conf. on Computational Linguistics and t44th Annual Mtg, of Association for Computational Linguistics, pp. 489-496, Jul. 2006, Association for Computational Linguistics © 2006.

Duda, C. et al., "AJAXSearch: Crawling, Indexing and Searching Web 2.0 Applications," Proc. of VLDB Endowment '08, Aug. 23-28, 2008, vol. 1, No. 2, pp. 1440-1443, VLDB Endowment, ACM © 2008.

Mesbah, A. et al., "Crawling AJAX-based Web Applications through Dynamic Analysis of User Interface State Changes," ACM Transactions on the Web (TWEB) Journal, vol. 6, No. 1, Art. No. 3, Mar. 2012, 30 pg.

Madhavan, J. et al., "Google's Deep-Web Crawl," Proc. of VLDB Endowment '08, Aug. 23-28, 2008, vol. 1, No. 2, pp. 1241-1252, VLDB Endowment, ACM © 2008.

* cited by examiner

Identification system 300

```
<tr>
    <td>Windsor</td>                                    406                              404
    <td>Accusation</td>
    <td>
        <a href="javascript:ajaxFunction('myevent',1413)">Armed with a ...</a>
    </td>
                    402
</tr>
<tr>
    <td>Chelmsford</td>                                 408                              404
    <td>Accusation</td>
    <td>
        <a href="javascript:ajaxFunction('myevent',726)">Joan Waterho...</a>
    </td>
                    402
</tr>
<tr>
    <td>Spittal</td>                                    410                              404
    <td>Accusation</td>
    <td>
        <a href="javascript:ajaxFunction('myevent',1521)">John Hutto...</a>
    </td>
                    402
</tr>
```

<a href="javascript:ajaxFunction('myevent',1413)">   412

FIG. 5

```
<td>                                                                            500
        <map id="navmap0" name="navmap0">
                <area
                        coords="79.2,42,141.9,54.3,126,135.3,63.3,123"          510
                        shape="poly"
                        onclick="openDeck(570)"                                  502
                        alt="<B>Mother....</B>"                      512
                        class="jTip"
                        id="mapArea570-34_21__Event Type 1<BR/><B>FamiliarMagic</B>_Event
Type 2<BR/><B>Murder</B>_">
                <area
                        coords="54.3,39,114,15.9,143.4,93,83.7,115.8"           510
                        shape="poly"                                             502
                        onclick="openDeck(570)"
                        alt="<i>Location</i>: Hatfield"
                        class="jTip"                                            512
                        id="mapArea570-LB______">
                <area
                        coords="22.8,58.8,86.4,54.3,92.1,136.5,28.5,141"        510
                        shape="poly"                                             502
                        onclick="openDeck(570)"
                        alt="<i>Source</i>: The Ex... "
                        class="jTip"                                       512
                        id="mapArea570-SC______">
        </map>                                                                  504
        <div id="mapArea570">
                <a href="javascript:openDeck(570);">
                        <img class="deck" alt="Assertion Deck" src="Decks-a20/570.jpg" texttobedisplayed=""
usemap="#navmap0" id="mapImage570">
                </a>
        </div>
</td>
```

FIG. 5 contd.

```
<td>
    <map id="navmap1" name="navmap1">
        <area
            coords="45,58.5,108.6,51.9,117.3,133.8,53.7,140.7"
            shape="poly"
            onclick="openDeck(1518)"
            alt="<B>Joan Haddo"
            class="jTip"
            id="mapArea1518-48_7__Event Type 1<BR/><B>Accusation</B>_Event Type 2<BR/><B>Trial</B>_">
        <area
            coords="2.1,53.1,56.7,20.1,99.3,90.9,44.4,123.6"
            shape="poly"
            onclick="openDeck(1518)"
            alt="<i>Location</i>: Chelmsford"
            class="jTip"
            id="mapArea1518-LB_____">
        <area
            coords="31.2,68.4,84.6,33.6,129.6,102.9,76.2,137.7"
            shape="poly"
            onclick="openDeck(1518)"
            alt="<i>Source</i>: Calen... "
            class="jTip"
            id="mapArea1518-SC_____">
        <area
            coords="61.2,29.7,111.6,69,60.6,134.1,10.2,94.8"
            shape="poly"
            onclick="openDeck(1518)"
            alt="<i>Person</i>: Joan Haddon"
            class="jTip"
            id="mapArea1518-p29___Classification1<BR/><B>Suspect</B>__">...
    </map>
    <div id="mapArea1518">
        <a href="javascript:openDeck(1518);">
            <img class="deck" alt="Assertion Deck" src="Decks-a20/1518.jpg" texttobedisplayed="" usemap="#navmap1" id="mapImage1518">
        </a>
    </div>
</td>

<a href="javascript:openDeck(xxx);">

<area
    coords="xxx"
    shape="poly"
    onclick="openDeck(yyy)"
    alt="zzz"
    class="jTip"
    id="www">
```

IDENTIFYING EQUIVALENT JAVASCRIPT EVENTS

CROSS-REFERENCE TO RELATED APPLICATIONS

This application claims the benefit of Canada Application Number 2786418 filed on Aug. 16, 2012, which is fully incorporated herein by reference.

BACKGROUND

A website crawler is a tool that performs an automatic exploration of a website. This task is beneficial for many applications from a simple indexing of information task, to more complex compliance testing, to name a few.

One of the challenges faced by automated tools is an ability to determine whether two JavaScript events on a page perform equivalent actions. Equivalent in this sense means, executing the two JavaScript events independently to create a document object model (DOM) of the page in which the two states are equivalent. Determining whether two JavaScript events are equivalent is useful because websites providing service such as news, blogs, on-line stores, and emails, have many JavaScript actions that perform equivalent tasks.

In practice, there are normally several sets of equivalent events on a given page, and each event from an equivalent set may lead to displaying a single news item, a single blog entry, a single item in a store, or a single email. Each set may be referred to as a set of equivalent JavaScript events. Executing all possible equivalent JavaScript events of a website is a time consuming task that is not required in all cases. For example, when performing a security scan, a crawler is more interested in a structure of a webpage, than the text content of the webpage. In this example, executing just one link in an equivalent set is typically enough, with results being generalized for every other equivalent JavaScript action.

In addition, most websites on subsequent visits typically change the set of equivalent JavaScript events displayed to the user. Accordingly, a news site displays the latest news, a blog displays the latest blogs, and an on-line store displays the items on sale. The crawling of such websites, is further complicated because the container page comprising all equivalent JavaScript actions will never be the same, and therefore a crawler will not know that the current page was a previously visited page.

When a web crawler does not understand which JavaScript events are equivalent the crawler is typically not be able to identify whether the current page was previously visited because the content inside the red box has likely changed. The web crawler is typically unable to finish scanning a current website, because every action taken to modify a search criteria brings new content on the page.

Current workarounds for the identified problem typically include limiting a number of JavaScript actions executed on a page, or performing a human guided exploration of the website. Other solutions typically require the web crawler to execute JavaScript actions and compare the two DOMs that result.

BRIEF SUMMARY

According to one embodiment, a computer-implemented process for identifying equivalent JavaScript events receives source code containing two JavaScript events for equivalency analysis, extracts an HTML element containing an event from each JavaScript event of the received source code to form extracted elements and analyzes the extracted HTML elements using a processor. The computer-implemented process determines whether the HTML elements are of a same type according to equivalency criteria B and responsive to a determination that the HTML elements are of a same type according to equivalency criteria B, determines whether the HTML elements have a same number of attributes according to equivalency criteria C. Responsive to a determination that the HTML elements have a same number of attributes according to equivalency criteria C, the computer-implemented process determines whether JavaScript function calls of each JavaScript event are similar according to equivalency criteria A and responsive to a determination that the JavaScript function calls are similar according to equivalency criteria A, the computer-implemented process determines whether other attributes of the HTML elements satisfy equivalency criteria D. Responsive to a determination that the other attributes of the HTML elements satisfy equivalency criteria D, the computer-implemented process identifies the JavaScript events as equivalent.

According to another embodiment, a computer program product for identifying equivalent JavaScript events comprises a computer readable data storage medium containing computer executable program code stored thereon. The computer executable program code includes computer executable program code for receiving source code containing two JavaScript events for equivalency analysis; computer executable program code for extracting an HTML element containing an event from each JavaScript event of the received source code to form extracted elements; computer executable program code for analyzing the extracted HTML elements; computer executable program code for determining whether the HTML elements are of a same type according to equivalency criteria B; computer executable program code responsive to a determination that the HTML elements are of a same type according to equivalency criteria B, for determining whether the HTML elements have a same number of attributes according to equivalency criteria C; computer executable program code responsive to a determination that the HTML elements have a same number of attributes according to equivalency criteria C, for determining whether JavaScript function calls of each JavaScript event are similar according to equivalency criteria A; computer executable program code responsive to a determination that the JavaScript function calls are similar according to equivalency criteria A, for determining whether other attributes of the HTML elements satisfy equivalency criteria D and computer executable program code responsive to a determination that the other attributes of the HTML elements satisfy equivalency criteria D, for identifying the JavaScript events as equivalent.

According to another embodiment, an apparatus for identifying equivalent JavaScript events includes a processor programmed to initiate executable operations. The executable operations include receiving source code containing two JavaScript events for equivalency analysis, extracting an HTML element containing an event from each JavaScript event of the received source code to form extracted elements and analyzing the extracted HTML elements. The executable operations further include determining whether the HTML elements are of a same type according to equivalency criteria B and responsive to a determination that the HTML elements are of a same type according to equivalency criteria B, determining whether the HTML elements have a same number of attributes according to equivalency criteria C. The executable operations also include, responsive to a determination that the HTML elements have a same number of attributes according to equivalency criteria C, determining whether JavaScript function calls of each JavaScript event are similar according to equivalency criteria A and responsive to a determination that the JavaScript function calls are similar according to equivalency criteria A, determining whether other attributes of the HTML elements satisfy equivalency criteria D. Responsive to a determination that the other attributes of the HTML elements satisfy equivalency criteria D, the JavaScript events are identified as equivalent.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

This disclosure relates generally to exploration of data in a data processing system and more specifically to identifying equivalent JavaScript™ events in a predefined collection of data in the data processing system.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium is any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
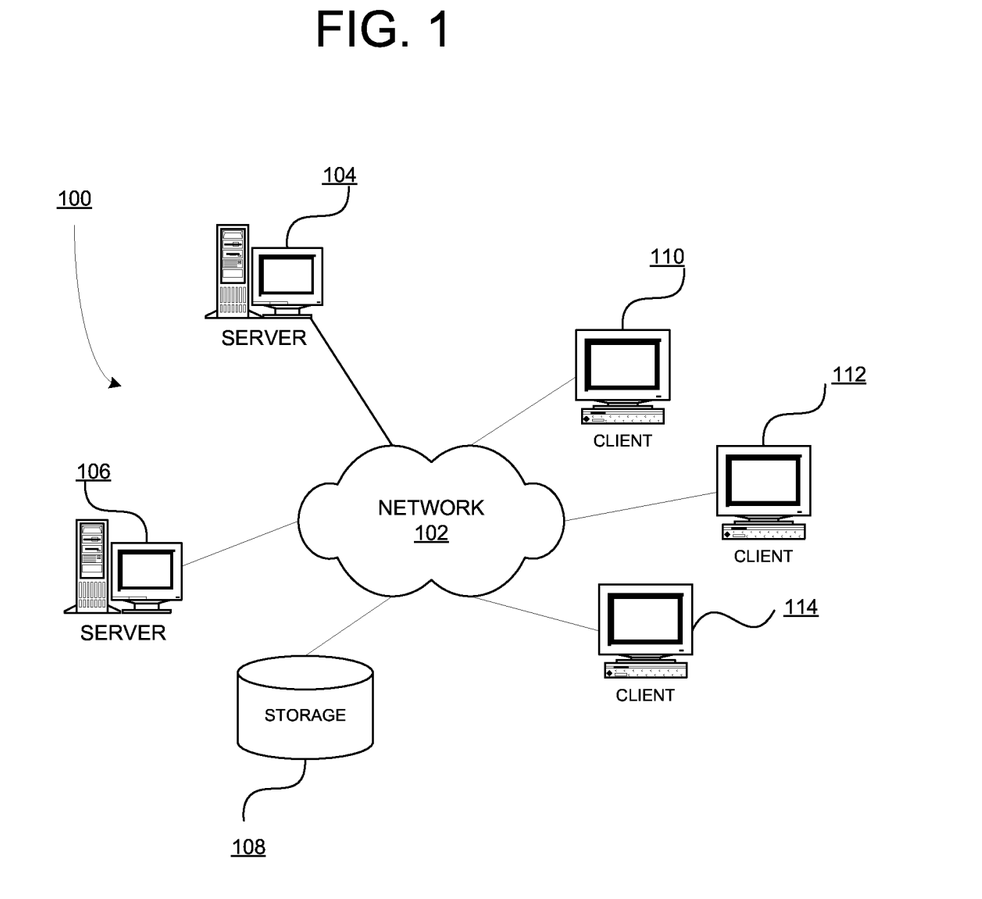
FIG. 1 is a block diagram of an exemplary network data processing system operable for various embodiments of the disclosure.
Figure 2:
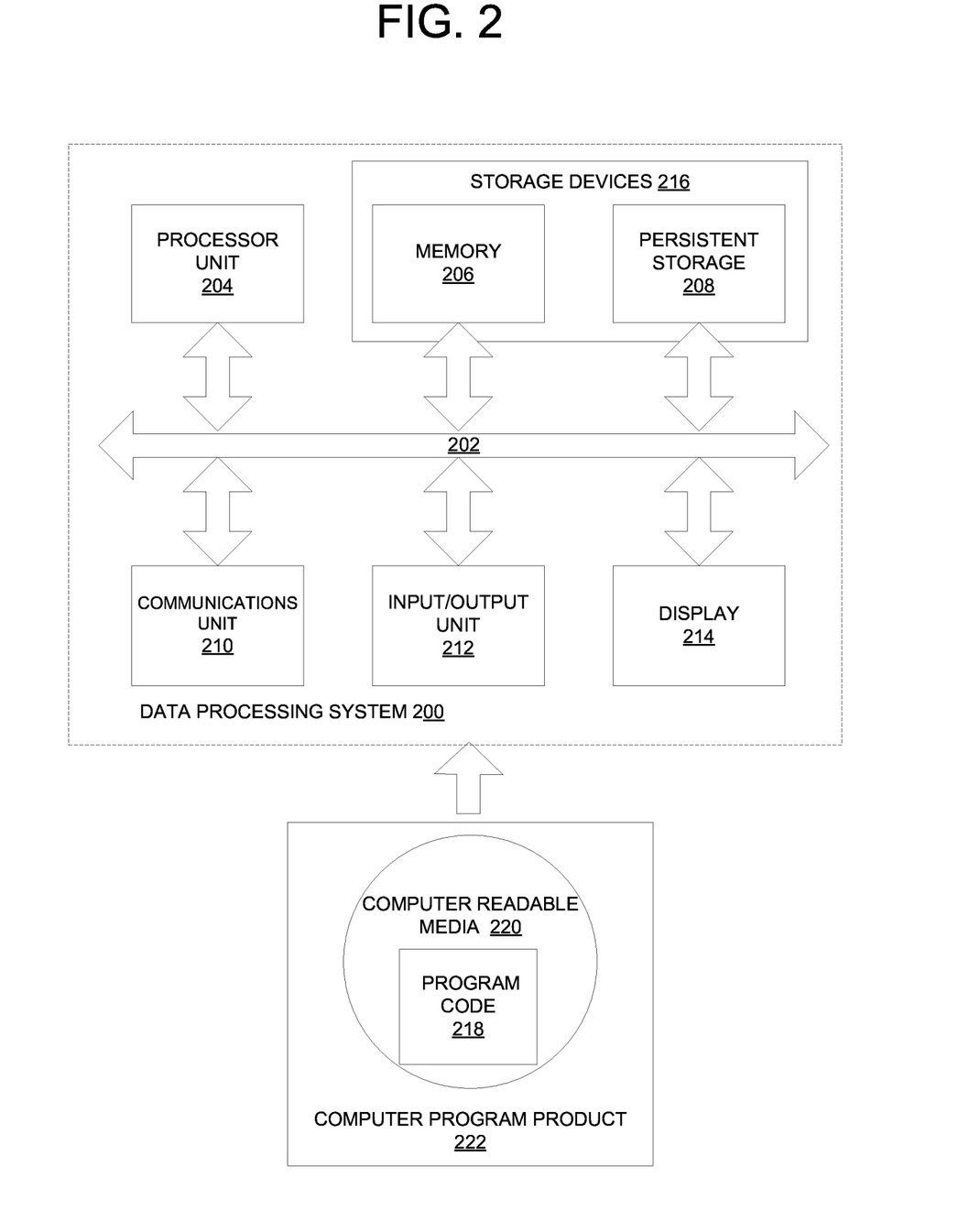
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for identifying equivalent JavaScript events is presented. The disclosed process enables a web crawler to programmatically determine when two or more JavaScript actions are equivalent. Use of embodiments of the disclosed process does not require JavaScript actions to be executed upfront to detect equivalency.

Processor unit 204 receives source code containing two JavaScript events for equivalency analysis, using communications unit 210, input/output unit 212 or storage devices 216, extracts an HTML element containing an event from each JavaScript event of the received source code to form extracted elements and analyzes the extracted HTML elements. Processor unit 204 determines whether the HTML elements are of a same type according to equivalency criteria B and responsive to a determination that the HTML elements are of a same type according to equivalency criteria B, determines whether the HTML elements have a same number of attributes according to equivalency criteria C. Processor unit 204 responsive to a determination that the HTML elements have a same number of attributes according to equivalency criteria C, determines whether JavaScript function calls of each JavaScript event are similar according to equivalency criteria A and responsive to a determination that the JavaScript function calls are similar according to equivalency criteria A, processor unit 204 determines whether other attributes of the HTML elements satisfy equivalency criteria D. Responsive to a determination that the other attributes of the HTML elements satisfy equivalency criteria D, processor unit 204 identifies the JavaScript events as equivalent. The identified equivalent JavaScript events may be saved in storage devise 216 for subsequent processing or made available to other applications through communications unit 210.

Figure 3:
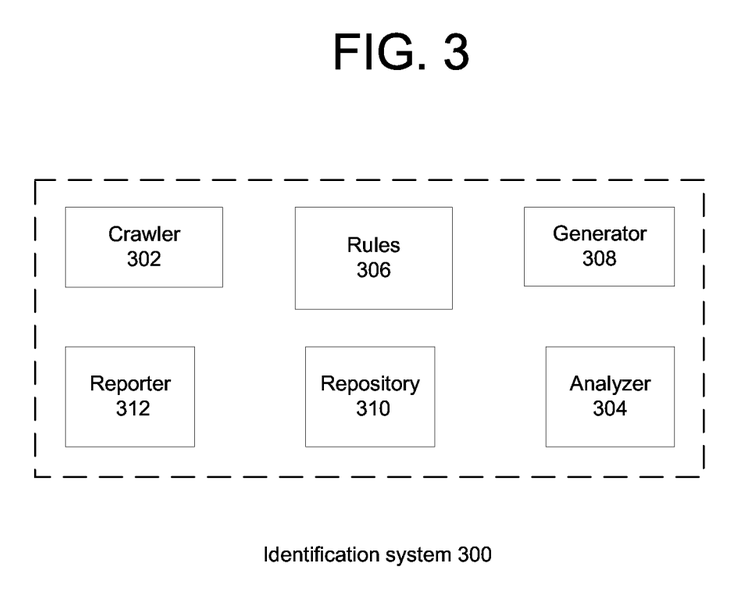
FIG. 3 is a block diagram of an identification system operable for various embodiments of the disclosure.

With reference to FIG. 3 a block diagram of an identification system operable for various embodiments of the disclosure is presented. Identification system 300 is an example of an equivalency identification system of an embodiment of the disclosure.

Identification system 300 comprises a number of component operations of a functional unit leveraging underlying services of a data processing such as network data processing 100 of FIG. 1 or data processing system 200 of FIG. 2. Identification system 300 may be implemented as a collection of discrete components in an interdependent relationship in which the components are operatively coupled to exchange data or as a monolithic entity embodying the functional components without affecting the functional capability of the disclosed process.

Identification system 300 provides a capability of identifying equivalent JavaScript events using a collection of cooperative components comprising crawler 302, analyzer 304, rules 306, generator 308, repository 310 and reporter 312. Identification system 300 provides a package, which may be implemented as an enhancement to a current crawler or as a new function to an existing system. The example using a web crawler is one embodiment; alternative embodiments include a data explorer capability for analyzing data for example when indexing non-web based data. Accordingly the disclosed process is not restricted to use in only a web-based environment of the example.

Crawler 302 provides a capability of a conventional web crawler with an added ability to perform the added function of the disclosed process. In an embodiment the disclosed process is integrated within an existing web crawler, but as mentioned the function of a crawler with the disclosed process may be used in a non web-based environment equally well.

Analyzer 304 provides a capability of a parser and a comparator to examine provided data to determine equivalency of pairs of JavaScript events. A parser portion of analyzer 304 traverses input code to identify relevant information such as predetermined HTML tags and corresponding attributes of the identified HTML tags. A comparator portion of analyzer 304 compares the portions of each event in the pairs of JavaScript events according to predefined criteria in rules 306. Rules 306 is a collection of specifications defining criteria under which equivalency is determined. Rules 306 provide specification of the individual conditions, which combine to define the equivalency requirement criteria against which the pairs of JavaScript events are evaluated. Examples of rules forming rules 306 are provided in relation to FIG. 4.

Generator 308 provides a capability to create a document object model using information associated with a JavaScript event being evaluated. For example a new document object model (DOM) is constructed after an event is executed.

Repository 310 provides a capability to persist information used within the disclosed process and to contain results available to users of the disclosed process. Repository 310 provides a storage location information associated with the disclosed process including for example, intermediate results, generated DOMs, and final results of identification, for example a list of equivalent JavaScript events.

Reporter 312 provides a capability to generate output of the results of the identification process of identification system 300 for use by others, including applications. For example a simple list of equivalent JavaScript events may be made available or a path name for a location within a file or database instance may be provided as required by an embodiment.

Figure 4:
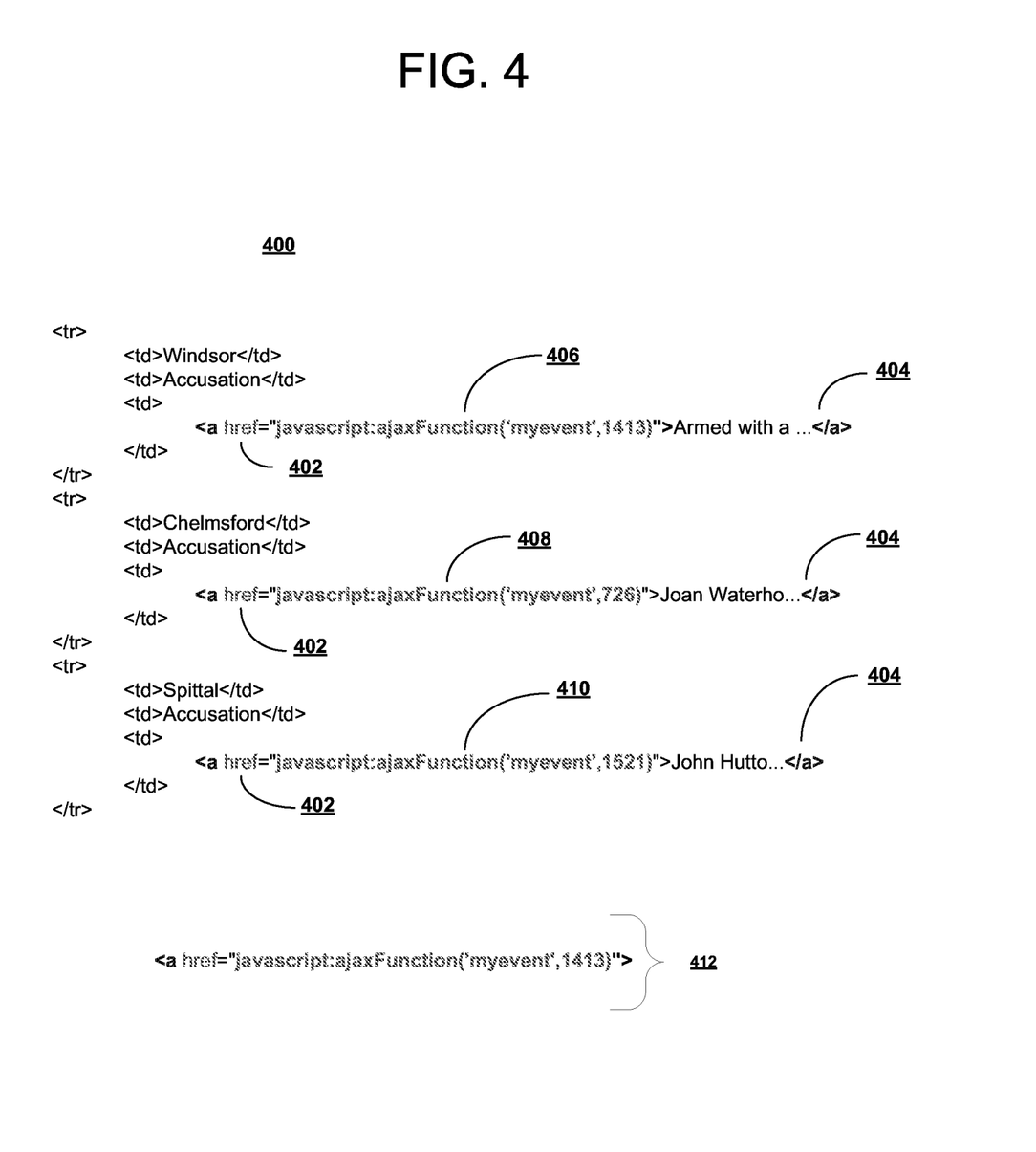
FIG. 4 is a code snippet representation a document object compliance of equivalence requirements using the identification system of FIG. 3 operable for various embodiments of the disclosure.

With reference to FIG. 4 a code snippet representation a document object compliance of equivalence requirements operable for various embodiments of the disclosure is presented. Code snippet 400 is an example of JavaScript event equivalence using the identification system 300 of FIG. 3.

Embodiments of the disclosure use the following definition of JavaScript event equivalence criteria. JavaScript event 1 is equivalent with JavaScript event 2 when the pair events satisfy all of the requirements for equivalence. Equivalence criteria A require equivalent JavaScript actions will follow a similar JavaScript function call pattern (for example as portions 406, 408 and 410). Equivalence accordingly requires calls to have the same function name, the number of parameters and the same parameter types with different or equal parameter values. Optionally a static analysis of the function body can be performed. However, the static analysis of the function body is not required for an embodiment of the proposed process.

Equivalence criteria B require the HTML elements that contain the equivalent JavaScript actions are always of the same HTML element type (for example, elements of portions 404). Equivalence criteria C require the HTML elements that contain the equivalent JavaScript actions have the same number of other HTML attributes (for example, elements of portion 402).

Equivalence criteria D require all other attribute values for the HTML element that contains the JavaScript action to satisfy the criteria of when the values are non-JavaScript calls, the calls need to have the same values and when the values are JavaScript calls/actions, the calls/actions need to comply with previously defined criteria A. Note, there are a few attributes that will be an exception to this rule for example HTML elements including id, alt, title, coordinates, because the respective value is expected to change between different entries. Therefore, any attribute that refers to a position (for example, coordinate), further explains the information contained in the HTML element (for example, alt, title), or uniquely identifies an entry (for example, id) should be excluded from this rule.

An embodiment of the process for JavaScript event equivalency can be executed against events that are on the same DOM of a page or an Ajax state. Furthermore, an embodiment of the event equivalency process can also be executed on different DOMs that are extracted from different Ajax states or different DOMs of the same Ajax state but at different time intervals.

The event equivalence process determines for 2 events to be equivalent the pair of events need to satisfy all equivalency requirements of criteria A, B, C and D and when at least one of the stated requirements is not satisfied, the two events cannot be equivalent. The equivalency function needs to be applied for every pair of JavaScript events from the pool of events needing analysis. The events can belong to the same DOM or to separate DOMs.

Applying the equivalence requirements criteria A, B, C and D in combination to the example of code snippet 400 indicate events can be grouped into a set of equivalent events that follow a pattern. In the example the pattern is shown in statement 412, as <a href="javascript:ajaxFunction('myevent',1413)">. This pattern has a similar JavaScript function call across the statements in the form of: javascript:ajaxFunction('myevent',xxx), contained within <a> HTML elements, wherein the <a> elements have one attribute (for example, href) for all instances.

Note that for this particular website of the example, when a search action is selected, the content of the DOM will bring new equivalent events, and therefore, understanding that the new events are equivalent with the previous events helps the crawler to uniquely identify a container page. In addition, subsequent visits to the webpage will give different equivalent events when new entries are added in the database.

Figure 5:
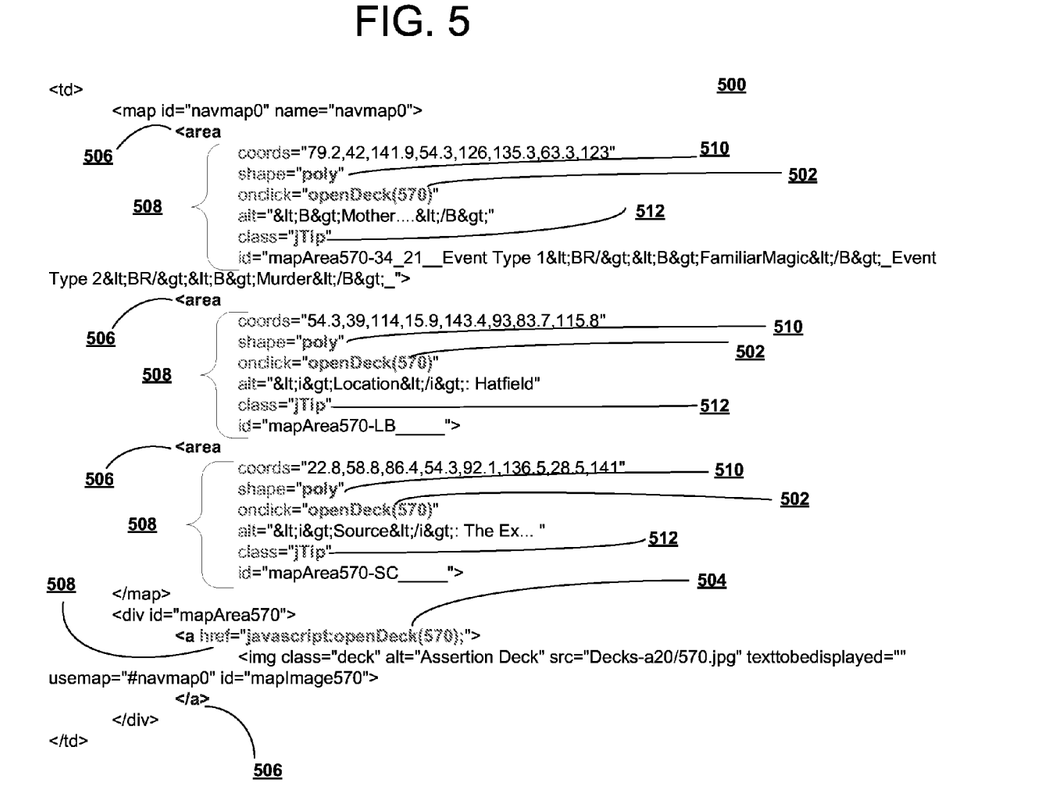
FIG. 5 is a code snippet representation a document object compliance of equivalence requirements using the identification system of FIG. 3 operable for various embodiments of the disclosure.

With reference to FIG. 5 a code snippet representation a document object compliance of equivalence requirements operable for various embodiments of the disclosure is presented. Code snippet 500 is an example of JavaScript event equivalence using the identification system 300 of FIG. 3.

Applying equivalence requirement criteria of A, B, C and D to the example of code snippet 500 shows that events can be grouped into two sets of equivalent events that have a first set of equivalent events following a pattern in statement 514 of <a href="javascript:openDeck(xxx);">. The events have a similar JavaScript function call in the form of javascript:ajaxFunction('myevent',xxx), (for example, portion 504 of a call javascript:openDeck(570)) the events are contained within <a> HTML elements 506, and the <a> elements have one attribute (for example, HTML element 508 of href) for all instances.

A second set of equivalent events follow a next pattern as in statement 516, for example, a set of HTML elements 508 of an HTML element 506 of area as in:

```
<area
coords="xxx" shape="poly"
onclick="openDeck(yyy)" alt="zzz"
class="jTip"
id="www">
```

These equivalent actions have a similar JavaScript function call in pattern 502 in the form of openDeck(yyy), they are contained in <area> HTML elements 506, the <area> elements have a set of six attributes (for example, HTML elements 508 comprising cords, shape, onclick, alt, class, id) for all instances. Finally, attributes that do not refer to a position, further explain information contained in the HTML element, or uniquely identify the entry, have the same values. In this example, HTML elements 508 attributes of shape and class have respective values of poly 510 and jTip 512.

Embodiments of the disclosed process accordingly do not rely on user input; rather conditions of requirement criteria A, B, C and D which comprise expert knowledge equivalency observations, are used to programmatically identify equivalent JavaScript actions. Furthermore, embodiments of the JavaScript equivalency process disclosed can be applied on JavaScript actions that belong to the same or different Ajax states. When using embodiments of the disclosed process, execution of JavaScript actions is not required to infer JavaScript actions are equivalent.

Figure 6:
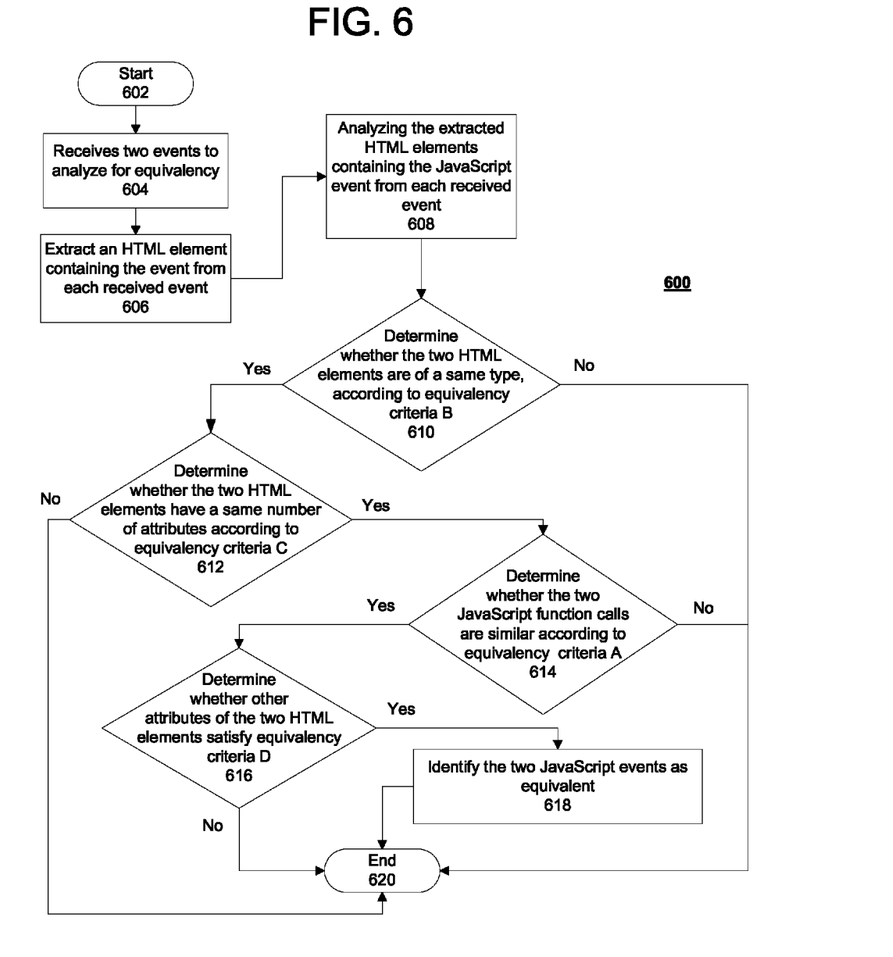
FIG. 6 is a flowchart of an event equivalency process using the identification system of FIG. 3 operable for various embodiments of the disclosure.

With reference to FIG. 6 a flowchart of an event equivalency process operable for various embodiments of the disclosure is presented. Process 600 is an example of an event equivalency process using identification system 300 of FIG. 3. Process 600 can be applied each time a crawler needs to determine whether two JavaScript events are equivalent.

Process 600 begins (step 602) and receives two events to analyze for equivalency (step 604). When receiving source code containing two JavaScript events for equivalency analysis, the two events may have been previously selected from a pool of events or may be provided as next two events in a predetermined order or any other selection process providing pairs of event for analysis. Process 600 extracts an HTML element containing the event from each received event to form extracted HTML elements (step 606). Process 600 analyzes the extracted HTML elements containing the JavaScript event from each received event of the received source code containing two JavaScript events for equivalency analysis (step 608).

Process 600 determines whether the two HTML elements are of a same type according to equivalency criteria B (step 610). The two HTML elements extracted in step 606 are involved in the comparison operation. Responsive to a determination that the two HTML elements are not of a same type according to equivalency criteria B, process 600 terminates (step 620).

Responsive to a determination that the two HTML elements are of a same type according to equivalency criteria B, process 600 determines whether the two HTML elements have a same number of attributes according to equivalency criteria C (step 612). Responsive to a determination that the two HTML elements do not have a same number of attributes according to equivalency criteria C, process 600 terminates (step 620).

Responsive to a determination that the two HTML elements have a same number of attributes according to equivalency criteria C, process 600 determines whether the two JavaScript function calls are similar according to equivalency criteria A (step 614). Responsive to a determination that the two JavaScript function calls are not similar according to equivalency criteria A, process 600 terminates (step 620).

Responsive to a determination that the two JavaScript function calls are similar according to equivalency criteria A, process 600 determines whether other attributes of the two HTML elements satisfy equivalency criteria D (step 616). Responsive to a determination that the other attributes of the two HTML elements do not satisfy equivalency criteria D, process 600 terminates (step 620).

Responsive to a determination that the other attributes of the two HTML elements satisfy equivalency criteria D, process 600 identifies the two JavaScript events as equivalent (step 618) and terminates thereafter (step 620).

Figure 7:
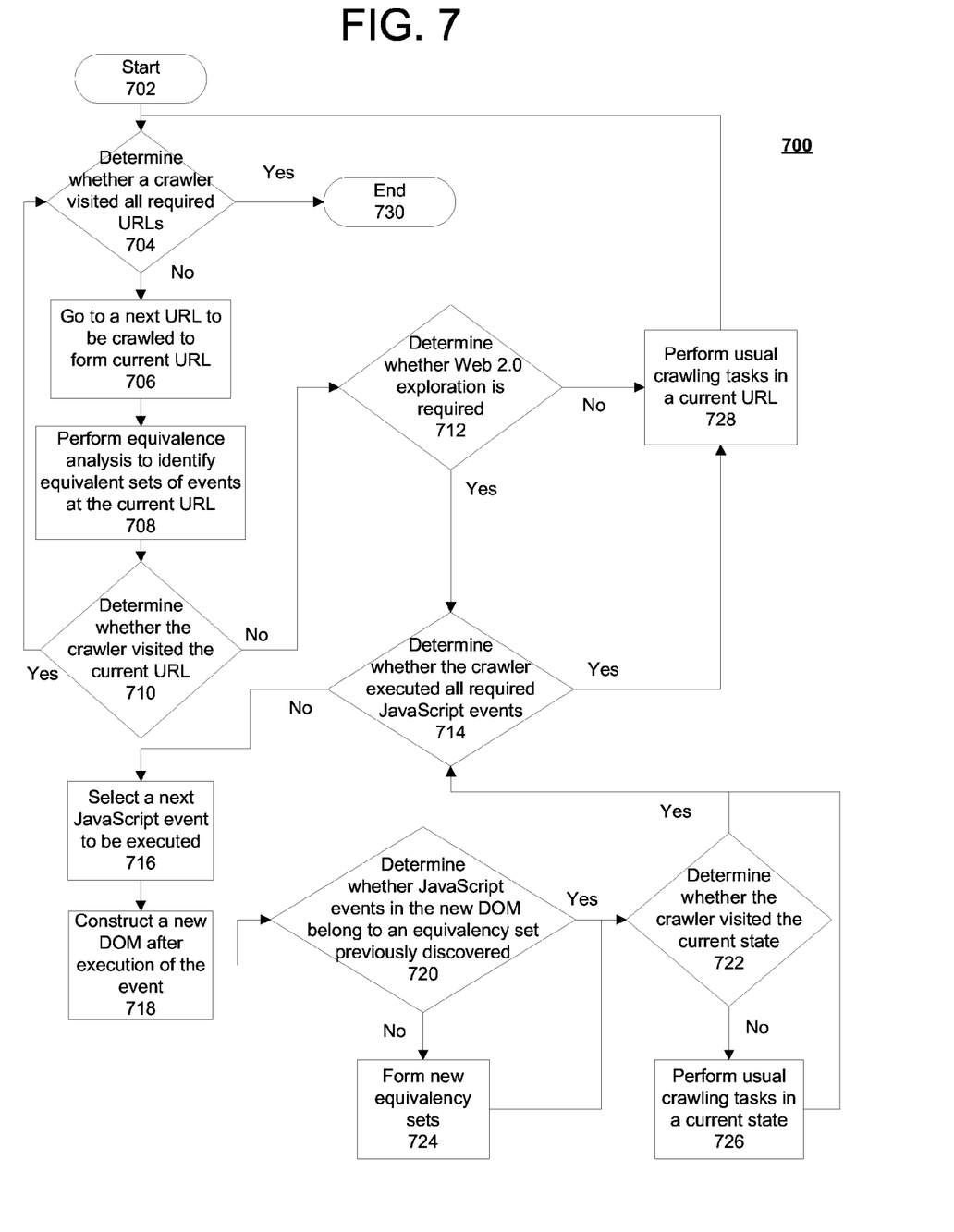
FIG. 7 is a flowchart of crawling process integrating an event equivalency process using the identification system of FIG. 3 operable for various embodiments of the disclosure.

With reference to FIG. 7 a flowchart of crawling process integrating an event equivalency process operable for various embodiments of the disclosure is presented. Process 700 is an example of a crawling process integrating an event equivalency process using identification system 300 of FIG. 3. The event equivalency process is integrated in the crawling process of a website. The flowchart mimics a general exploration task a typical web crawler performs. The exploration strategy of such websites is out of the scope of the current disclosure.

Process 700 begins (step 702) and determines whether a crawler visited all required universal resource locators (URLs) (step 704). Responsive to a determination that a crawler visited all required universal resource locators, process 700 terminates (step 730). Responsive to a determination that a crawler has not visited all required universal resource locators, process 700 goes to a next URL to be crawled to form a current URL (step 706). The next URL to be crawled is identified in a typical identification process known in the art of crawling web pages of the example.

Process 700 performs an equivalency analysis to identify equivalent sets of events using the current URL (step 708). The equivalency analysis used to identify equivalent sets of events using the current URL is process 600 of FIG. 6. Process 700 determines whether the crawler visited the current URL (step 710). The results of the equivalency analysis provide input to the determination sub-process of step 710.

Responsive to a determination that the crawler visited the current URL, process 700 loops back to perform step 704 as before. Responsive to a determination that the crawler has not visited the current URL, process 700 determines whether a Web 2.0 exploration is required (step 712). As previously stated, Web sites using Web 2.0 typically have a high number of equivalent JavaScript operations.

Responsive to a determination that Web 2.0 exploration is not required process 700 performs usual crawling tasks using the current URL (step 728). Process 700 loops back to perform step 704 as before. Responsive to a determination that Web 2.0 exploration is required process 700 determines whether the crawler executed all required JavaScript events (step 714). Responsive to a determination that the crawler executed all required JavaScript events, process 700 loops back to perform step 728 as before.

Responsive to a determination that the crawler executed all required JavaScript events, process 700 selects a next JavaScript to be executed (step 716). Process 700 constructs a new document object model (DOM) after execution of the event (step 718). Process 700 determines whether JavaScript events in the new DOM belong to an equivalency set previously discovered (step 720). Discovery may include a lookup in a database or a name comparison performed using members of a list or other suitable means to review events that have been found to be equivalent.

Responsive to a determination those JavaScript events in the new DOM do not belong to an equivalency set previously discovered, process 700 forms a new equivalency set (step 724). A new equivalency set may be formed for each new pattern identified, wherein events matching a defined pattern are added to the set previously formed. Responsive to a determination that JavaScript events in the new DOM belong to an equivalency set previously discovered, process 700 determines whether the crawler visited the current state (step 722). When a crawler determines the same URL or the same state was previously visited in step 722, the crawler considers the set of equivalent events. This consideration enables cases when those equivalent events change in the webpage over time to be handled.

Responsive to a determination that the crawler visited the current state, process 700 loops back to perform step 714 as before. Responsive to a determination that the crawler has not visited the current state, process 700 performs usual crawling tasks using the current state (step 726), with process 700 looping back to perform step 714 as before. A current state and a current URL may be used interchangeably.

A crawler may choose to execute one event or all equivalent events per equivalence class identified. For example, when security testing, one event per equivalence class would be sufficient, because the events will expose the same structure, whereas, when crawling for indexing executing all events per equivalence class is necessary because the events will expose different content.

After defining classes of equivalent events, execution of at least two random events for each equivalence class to determine whether the execution yields equivalent states may be performed. The execution check is useful for identifying webpage menus implemented using equivalent functions, which are not functionally equivalent because menu items typically yield two states that will not be equivalent. All events from this particular equivalence class need to be marked as not being equivalent.

Function name and parameters are of little use for JavaScript attached events (for example, event handlers added to an element using addEventListener( ) or attachEvent( )), because the function is usually anonymous, meaning the function has no name and an empty parameter list. The body of the function however can be converted to a string for the comparison. When dealing with cases, particularly with JavaScript frameworks, where function equivalence is too weak, other conditions on an element tag and attributes may provide distinguishing information.

Thus is presented in an illustrative embodiment a computer-implemented process for identifying equivalent JavaScript events receives source code containing two JavaScript events for equivalency analysis, extracts an HTML element containing an event from each JavaScript event of the received source code to form extracted elements and analyzes the extracted HTML elements. The computer-implemented process determines whether the HTML elements are of a same type according to equivalency criteria B and responsive to a determination that the HTML elements are of a same type according to equivalency criteria B, determines whether the HTML elements have a same number of attributes according to equivalency criteria C. Responsive to a determination that the HTML elements have a same number of attributes according to equivalency criteria C, the computer-implemented process determines whether JavaScript function calls of each JavaScript event are similar according to equivalency criteria A and responsive to a determination that the JavaScript function calls are similar according to equivalency criteria A, the computer-implemented process determines whether other attributes of the HTML elements satisfy equivalency criteria D. Responsive to a determination that the other attributes of the HTML elements satisfy equivalency criteria D, the computer-implemented process identifies the JavaScript events as equivalent.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process for identifying equivalent JavaScript events, the computer-implemented process comprising:
    receiving source code containing two JavaScript events for equivalency analysis;
    extracting an HTML element containing an event from each JavaScript event of the received source code to form extracted elements;
    analyzing the extracted HTML elements using a processor;
    determining whether the HTML elements are of a same type according to equivalency criteria B;
    responsive to a determination that the HTML elements are of a same type according to equivalency criteria B, determining whether the HTML elements have a same number of attributes according to equivalency criteria C;
    responsive to a determination that the HTML elements have a same number of attributes according to equivalency criteria C, determining whether JavaScript function calls of each JavaScript event are similar according to equivalency criteria A;
    responsive to a determination that the JavaScript function calls are similar according to equivalency criteria A, determining whether other attributes of the HTML elements satisfy equivalency criteria D; and
    responsive to a determination that the other attributes of the HTML elements satisfy equivalency criteria D, identifying the JavaScript events as equivalent.

2. The computer-implemented process of claim 1 wherein equivalency criteria B require the HTML elements that contain equivalent JavaScript actions are of a same HTML element type.

3. The computer-implemented process of claim 1 wherein equivalency criteria A require equivalent JavaScript actions to follow a similar JavaScript function call pattern, wherein the pattern accordingly requires JavaScript function calls to have a same function name, number of parameters and same parameter types with different or equal parameter values.

4. The computer-implemented process of claim 1 wherein equivalency criteria C require the HTML elements that contain equivalent JavaScript actions have a same number of other HTML attributes.

5. The computer-implemented process of claim 1 wherein equivalency criteria D require all other attribute values for the HTML element that contains an equivalent JavaScript action to satisfy criteria of when the attribute values are non-JavaScript calls, the non-JavaScript calls have the same values and when the attribute values are JavaScript calls/actions, the JavaScript calls/actions comply with equivalency criteria A; and     wherein equivalency criteria A require equivalent JavaScript actions to follow a similar JavaScript function call pattern, wherein the pattern accordingly requires JavaScript function calls to have a same function name, number of parameters and same parameter types with different or equal parameter values.

6. The computer-implemented process of claim 1 wherein receiving source code containing two JavaScript events for equivalency analysis further comprises one of the source for web-based information and the source for non-web-based information.

7. The computer-implemented process of claim 1 further comprises:

integrating the process for identifying equivalent JavaScript events in a crawling process of a website.

8. A computer program product for identifying equivalent JavaScript events, comprising:

a computer readable data storage device containing computer executable program code stored thereon, the computer executable program code comprising:

computer executable program code for receiving source code containing two JavaScript events for equivalency analysis;

computer executable program code for extracting an HTML element containing an event from each JavaScript event of the received source code to form extracted elements;

computer executable program code for analyzing the extracted HTML elements;

computer executable program code for determining whether the HTML elements are of a same type according to equivalency criteria B;

computer executable program code responsive to a determination that the HTML elements are of a same type according to equivalency criteria B, for determining whether the HTML elements have a same number of attributes according to equivalency criteria C;

computer executable program code responsive to a determination that the HTML elements have a same number of attributes according to equivalency criteria C, for determining whether JavaScript function calls of each JavaScript event are similar according to equivalency criteria A;

computer executable program code responsive to a determination that the JavaScript function calls are similar according to equivalency criteria A, for determining whether other attributes of the HTML elements satisfy equivalency criteria D; and         computer executable program code responsive to a determination that the other attributes of the HTML elements satisfy equivalency criteria D, for identifying the JavaScript events as equivalent, wherein the computer readable data storage device does not consist of a transitory, propagating signal.

9. The computer program product of claim 8 wherein computer executable program code for equivalency criteria B requires the HTML elements that contain equivalent JavaScript actions are of a same HTML element type.

10. The computer program product of claim 8 wherein computer executable program code for equivalency criteria A requires equivalent JavaScript actions to follow a similar JavaScript function call pattern, wherein the pattern accordingly requires JavaScript function calls to have a same function name, number of parameters and same parameter types with different or equal parameter values.

11. The computer program product of claim 8 wherein computer executable program code for equivalency criteria C requires the HTML elements that contain equivalent JavaScript actions have a same number of other HTML attributes.

12. The computer program product of claim 8 wherein computer executable program code for equivalency criteria D requires all other attribute values for the HTML element that contains an equivalent JavaScript action to satisfy criteria of when the attribute values are non-JavaScript calls, the non-JavaScript calls have the same values and when the attribute values are JavaScript calls/actions, the JavaScript calls/actions comply with equivalency criteria A; and     wherein computer executable program code for equivalency criteria A requires equivalent JavaScript actions to follow a similar JavaScript function call pattern, wherein the pattern accordingly requires JavaScript function calls to have a same function name, number of parameters and same parameter types with different or equal parameter values.

13. The computer program product of claim 8 wherein computer executable program code for receiving source code containing two JavaScript events for equivalency analysis further comprises computer executable program code for receiving one of the source code for web-based information and the source code for non-web-based information.

14. The computer program product of claim 8 further comprising:

computer executable program code for integrating the computer executable program code for identifying equivalent JavaScript events in a crawling process of a website.

15. An apparatus for identifying equivalent JavaScript events, the apparatus comprising:

a processor programmed to initiate executable operations comprising:

receiving source code containing two JavaScript events for equivalency analysis;

extracting an HTML element containing an event from each JavaScript event of the received source code to form extracted elements;

analyzing the extracted HTML elements;

determining whether the HTML elements are of a same type according to equivalency criteria B;

responsive to a determination that the HTML elements are of a same type according to equivalency criteria B, determining whether the HTML elements have a same number of attributes according to equivalency criteria C;

responsive to a determination that the HTML elements have a same number of attributes according to equivalency criteria C, determining whether JavaScript function calls of each JavaScript event are similar according to equivalency criteria A;

responsive to a determination that the JavaScript function calls are similar according to equivalency criteria A, determining whether other attributes of the HTML elements satisfy equivalency criteria D; and     responsive to a determination that the other attributes of the HTML elements satisfy equivalency criteria D, identifying the JavaScript events as equivalent.

16. The apparatus of claim 15 wherein equivalency criteria B require the HTML elements that contain equivalent JavaScript actions are of a same HTML element type.

17. The apparatus of claim 15 wherein equivalency criteria A require equivalent JavaScript actions to follow a similar JavaScript function call pattern, wherein the pattern accordingly requires JavaScript function calls to have a same function name, number of parameters and same parameter types with different or equal parameter values.

18. The apparatus of claim 15 wherein equivalency criteria C require the HTML elements that contain equivalent JavaScript actions have a same number of other HTML attributes.

19. The apparatus of claim 15 wherein equivalency criteria D require all other attribute values for the HTML element that contains an equivalent JavaScript action to satisfy criteria of when the attribute values are non-JavaScript calls, the non-JavaScript calls have the same values and when the attribute values are JavaScript calls/actions, the JavaScript calls/actions comply with equivalency criteria A; and     wherein equivalency criteria A require equivalent JavaScript actions to follow a similar JavaScript function call pattern, wherein the pattern accordingly requires JavaScript function calls to have a same function name, number of parameters and same parameter types with different or equal parameter values.

20. The apparatus of claim 15 wherein the processor unit executes the computer executable program code to receive source code containing two JavaScript events for equivalency analysis further directs the apparatus to receive one of the source code for web-based information and the source code for non-web-based information.

* * * * *